United States Patent
Burja et al.

(10) Patent No.: US 12,451,551 B2
(45) Date of Patent: Oct. 21, 2025

(54) METHOD FOR ARRANGING A HIGH-VOLTAGE ACCUMULATOR HAVING A PLURALITY OF BATTERY MODULES ON A SUPPORT STRUCTURE OF A MOTOR VEHICLE, AND HIGH-VOLTAGE ACCUMULATOR ARRANGEMENT

(71) Applicant: Bayerische Motoren Werke Aktiengesellschaft, Munich (DE)

(72) Inventors: Andreas Burja, Eching (DE); Robert Loch, Munich (DE); Christoph Warkotsch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 324 days.

(21) Appl. No.: 17/916,919

(22) PCT Filed: Apr. 20, 2021

(86) PCT No.: PCT/EP2021/060268
§ 371 (c)(1),
(2) Date: Oct. 4, 2022

(87) PCT Pub. No.: WO2021/214077
PCT Pub. Date: Oct. 28, 2021

(65) Prior Publication Data
US 2023/0155235 A1    May 18, 2023

(30) Foreign Application Priority Data
Apr. 21, 2020  (DE) ..................... 10 2020 110 744.7

(51) Int. Cl.
*H01M 50/249*  (2021.01)
*B60R 16/04*  (2006.01)
(Continued)

(52) U.S. Cl.
CPC ........... *H01M 50/249* (2021.01); *B60R 16/04* (2013.01); *H01M 50/204* (2021.01); *H01M 50/264* (2021.01); *H01M 2220/20* (2013.01)

(58) Field of Classification Search
CPC ............. H01M 50/249; H01M 50/204; H01M 50/264; H01M 2220/20; B60R 16/04
See application file for complete search history.

(56) References Cited

U.S. PATENT DOCUMENTS

| | | | |
|---|---|---|---|
| 10,622,740 B1* | 4/2020 | Kwon | H01R 13/629 |
| 2011/0223459 A1* | 9/2011 | Heichal | H01M 50/262 |
| | | | 403/33 |

(Continued)

FOREIGN PATENT DOCUMENTS

| | | |
|---|---|---|
| CN | 110040180 A | 7/2019 |
| CN | 110312634 A | 10/2019 |

(Continued)

OTHER PUBLICATIONS

International Search Report (PCT/ISA/210) issued in PCT Application No. PCT/EP2021/060268 dated Jun. 7, 2021 with English translation (five (5) pages).

(Continued)

*Primary Examiner* — Erez Gurari
(74) *Attorney, Agent, or Firm* — Crowell & Moring LLP (57) ABSTRACT

A method is provided for arranging a high-voltage accumulator having a plurality of battery modules on a support structure of a motor vehicle, in which the battery modules are arranged and fastened on a base plate, and the base plate is fastened on a bottom plate of the support structure of the motor vehicle, as a result of which the base plate and the bottom plate provide an accumulator housing which delimits an accumulator interior in which the battery modules are accommodated. At least one connection field is mechanically connected to the support structure. The connection (Continued)

field is able to electrically and/or fluidically connect the high-voltage accumulator to the motor vehicle.

7 Claims, 6 Drawing Sheets

(51) Int. Cl.
*H01M 50/204* (2021.01)
*H01M 50/264* (2021.01)

(56) References Cited

U.S. PATENT DOCUMENTS

| | | | | |
|---|---|---|---|---|
| 2013/0143083 | A1* | 6/2013 | Utley | H01M 50/367 |
| | | | | 429/88 |
| 2014/0079968 | A1* | 3/2014 | Schmidt | H01M 10/647 |
| | | | | 180/65.21 |
| 2016/0023689 | A1 | 1/2016 | Berger et al. | |
| 2016/0347183 | A1* | 12/2016 | Kusumi | H01M 50/209 |
| 2016/0359152 | A1* | 12/2016 | Nakayama | H01M 50/224 |
| 2016/0359153 | A1* | 12/2016 | Kano | H01M 50/20 |
| 2017/0005305 | A1* | 1/2017 | Harris | H01M 10/6557 |
| 2017/0005319 | A1* | 1/2017 | Rong | H01M 50/3425 |
| 2017/0005383 | A1* | 1/2017 | Harris | H01M 50/227 |
| 2018/0261899 | A1* | 9/2018 | Milton | H01M 10/6556 |
| 2018/0358667 | A1* | 12/2018 | Harris | B60L 50/64 |
| 2019/0217695 | A1 | 7/2019 | Hofer | |
| 2020/0112006 | A1 | 4/2020 | Ernst | |
| 2020/0223304 | A1* | 7/2020 | Bikmukhametov | |
| | | | | H01M 50/271 |
| 2021/0061080 | A1* | 3/2021 | Otoguro | B62D 21/15 |
| 2021/0159472 | A1* | 5/2021 | Obeid | H01M 50/502 |
| 2021/0226276 | A1* | 7/2021 | Sevel | H01M 10/613 |
| 2021/0402862 | A1* | 12/2021 | Yamada | H01M 50/209 |
| 2022/0037724 | A1* | 2/2022 | Provost | B60L 50/64 |
| 2022/0144068 | A1* | 5/2022 | Burja | B60K 1/04 |
| 2022/0258586 | A1* | 8/2022 | Amsz | B62D 25/2072 |
| 2022/0278390 | A1* | 9/2022 | Geskes | H01M 10/6554 |
| 2023/0184156 | A1* | 6/2023 | Gao | B60L 58/26 |
| 2023/0307766 | A1* | 9/2023 | Dugas | H01M 50/209 |
| 2024/0014495 | A1* | 1/2024 | Lanzerath | H01M 50/262 |
| 2024/0063473 | A1* | 2/2024 | Boddakayala | H01M 10/6554 |
| 2024/0072359 | A1* | 2/2024 | Loch | H01M 50/209 |
| 2024/0079669 | A1* | 3/2024 | Eftekhari | H01M 10/613 |
| 2024/0120610 | A1* | 4/2024 | Gerbrand | H01M 50/166 |
| 2024/0149655 | A1* | 5/2024 | Rollins | H01M 50/209 |
| 2024/0170785 | A1* | 5/2024 | Latif | H01M 50/249 |
| 2024/0194997 | A1* | 6/2024 | Oh | H01M 50/209 |
| 2024/0258599 | A1* | 8/2024 | Harsch | H01M 10/65 |
| 2024/0294060 | A1* | 9/2024 | Harsch | B62D 21/03 |
| 2024/0297363 | A1* | 9/2024 | Hickey | H01M 10/6556 |
| 2024/0297399 | A1* | 9/2024 | Hickey | H01M 10/625 |
| 2024/0313324 | A1* | 9/2024 | Hofer | H01M 10/613 |
| 2024/0317076 | A1* | 9/2024 | Favaretto | B60L 50/64 |
| 2024/0322325 | A1* | 9/2024 | Favaretto | H01M 10/613 |

FOREIGN PATENT DOCUMENTS

| | | |
|---|---|---|
| DE | 10 2008 061 757 A1 | 6/2010 |
| DE | 10 2012 224 114 A1 | 6/2014 |
| DE | 10 2014 110 307 A1 | 1/2016 |
| DE | 10 2015 000 579 A1 | 7/2016 |
| DE | 10 2017 203 206 A1 | 8/2018 |
| DE | 10 2017 219 895 A1 | 5/2019 |
| FR | 2 880 476 A1 | 7/2006 |
| FR | 2 942 188 A1 | 8/2010 |
| WO | WO 2016/012663 A1 | 1/2016 |
| WO | WO 2019/091643 A1 | 5/2019 |

OTHER PUBLICATIONS

German-language Written Opinion (PCT/ISA/237) issued in PCT Application No. PCT/EP2021/060268 dated Jun. 7, 2021 (five (5) pages).

German-language Search Report issued in German Application No. 10 2020 110 744.7 dated Mar. 5, 2021 with partial English translation (11 pages).

English translation of Chinese-language Office Action issued in Chinese Application No. 202180028307.0 dated Apr. 3, 2025 (9 pages).

\* cited by examiner

METHOD FOR ARRANGING A HIGH-VOLTAGE ACCUMULATOR HAVING A PLURALITY OF BATTERY MODULES ON A SUPPORT STRUCTURE OF A MOTOR VEHICLE, AND HIGH-VOLTAGE ACCUMULATOR ARRANGEMENT

BACKGROUND AND SUMMARY

The invention relates to a method for arranging a high-voltage accumulator having a plurality of battery modules on a support structure of a motor vehicle, and to a high-voltage accumulator arrangement of a high-voltage accumulator on a motor vehicle.

A method for integrating a high-voltage accumulator into a support structure of a motor vehicle is already known from WO 2019/091643 A1. The high-voltage accumulator has at least one accumulator module. In the method, a housing part is provided which has a base plate and a frame-shaped edge surrounding the base plate. The at least one accumulator module is arranged on the housing part and/or on the support structure. The edge of the housing part is arranged below and on a frame structure formed from beams of the support structure. Furthermore, it is provided in the method that the housing part is attached to the support structure forming an accumulator housing for the at least one accumulator module. In this case, a housing interior of the accumulator housing is delimited by a bottom part of the support structure covering a frame structure in the direction of a passenger compartment of the motor vehicle, by the housing part, and by the frame structure.

The object of the present invention is to provide a method for arranging a high-voltage accumulator having a plurality of battery modules on a support structure of a motor vehicle and also a high-voltage accumulator arrangement of a high-voltage accumulator on a motor vehicle which allow a particularly advantageous fluidic and/or electrical connection of the high-voltage accumulator to the motor vehicle.

This object is achieved in accordance with the invention by a method for arranging a high-voltage accumulator having a plurality of battery modules on a support structure of a motor vehicle and also by a high-voltage accumulator arrangement of a high-voltage accumulator on a motor vehicle having the features of the independent claims.

Advantageous embodiments of the invention are the subject of the dependent claims and the description.

A first aspect of the invention relates to a method for arranging a high-voltage accumulator having a plurality of battery modules on a support structure of a motor vehicle, in which method the battery modules are arranged on and fastened to a base plate. Here, each of the battery modules can comprise at least one, in particular a plurality of battery cells. In the method, it is further provided that the base plate is fastened to a bottom plate of the support structure of the motor vehicle, whereby the base plate and the bottom plate provide an accumulator housing. In particular, the support structure is a body of the motor vehicle. The accumulator housing delimits an accumulator interior in which the battery modules are accommodated. The high-voltage accumulator is thus a so-called housing-less high-voltage accumulator system, wherein the accumulator interior is delimited by the base plate and the bottom plate of the support structure. The bottom plate of the support structure thus provides a housing for the high-voltage accumulator, at least in some regions, whereby a conventional, separate housing of the high-voltage accumulator can be spared.

In the method, it is provided in accordance with the invention that at least one connection field is mechanically connected to the support structure. In this case, the connection field allows the high-voltage accumulator to be electrically and/or fluidically connected to the motor vehicle. The at least one connection field can be held particularly securely on the support structure via the mechanical connection of the connection field to the support structure. The connection field can have one or more mechanical interfaces via which electrical connection lines and/or fluid lines of the high-voltage accumulator can be connected to electrical connection lines or fluid lines of the motor vehicle. An electrical connection of the high-voltage accumulator to the motor vehicle can thus be provided via at least one electrical interface of the connection field, and electrical energy and/or information can be exchanged between the high-voltage accumulator and the motor vehicle via this electrical connection. A fluid connection between the high-voltage accumulator and the motor vehicle can be provided via at least one fluidic interface of the at least one connection field and can be used, for example, for the exchange of a cooling fluid between the high-voltage accumulator and the motor vehicle, whereby the high-voltage accumulator can be connected to a cooling circuit of the motor vehicle. In the method, it is provided in particular that all electrical and/or fluidic connections of the high-voltage accumulator to the motor vehicle are provided via the at least one connection field. The at least one connection field thus allows a particularly simple electrical and/or fluidic contacting of the high-voltage accumulator with the motor vehicle.

In a further embodiment of the invention, it has been shown to be advantageous if the at least one connection field is placed against the support structure on an outer side of the support structure facing away from the accumulator interior and is inserted in some regions through a through-opening in the support structure into the accumulator interior. The high-voltage accumulator, in particular at least one of the battery modules of the high-voltage accumulator, can be contacted with the at least one connection field via a region of the connection field which is inserted in some regions into the accumulator interior. The at least one connection field is thus arranged at least substantially outside the accumulator interior and projects into the accumulator interior only in some regions. As a result, the at least one connection field is delimited at least in some regions by the support structure from the battery modules arranged in the accumulator interior. In the method, it is provided in particular that the at least one connection field is sealed with respect to the outer side of the support structure. This can ensure a fluidically tight delimitation of the accumulator interior. The arrangement of the at least one connection field on the outer side of the support structure allows the base plate and the at least one connection field to be fastened separately to the support structure.

In a further alternative embodiment of the invention, it has been shown to be advantageous if the at least one connection field with the base plate is approached towards the support structure and is placed against and fastened to the support structure on an inner side of the support structure facing the accumulator interior. In this case, the at least one connection field can be preassembled on the base plate or on at least one battery module of the high-voltage accumulator. This method allows the delimiting of the accumulator interior and the electrical and/or fluidic contacting of the high-voltage accumulator with the motor vehicle to be carried out in a particularly small number of process steps, whereby the high-voltage accumulator can be mounted on the motor vehicle particularly quickly. In the arrangement resulting from this method, the at least one connection field is arranged together with the plurality of battery modules completely within the accumulator interior. The connection field can thus be protected from damage by the base plate and the bottom plate. This allows a particularly secure connection of the at least one battery module or the high-voltage accumulator to the at least one connection field.

In this context, it has proved particularly advantageous if the at least one connection field is sealed with respect to the inner side of the support structure. In particular, an outer side of the at least one connection field on the vehicle side can be sealed with respect to an outer side of the connection field on the battery side, whereby the sealing can ensure a tight enclosure of the accumulator interior. By sealing the accumulator interior, it can be ensured that a fluidic connection between the high-voltage accumulator and a surrounding environment of the high-voltage accumulator, in particular the motor vehicle, is provided only via the at least one connection field. Leakage of a liquid from the accumulator interior or penetration of contamination into the accumulator interior can be at least substantially prevented by sealing off the at least one connection field.

It has also proved advantageous if the at least one connection field is guided around a projection of the support structure when the base plate is approached towards the support structure, is guided at least in some regions into a recess of the support structure, the recess being delimited in some regions by the projection, and is fastened in this recess on the inner side of the support structure facing the accumulator interior. With this arrangement in the recess, at least in some regions, the at least one connection field can be protected by means of the support structure from damage. In order to be able to insert the at least one connection field into the recess, the at least one connection field is to be guided around the projection delimiting the recess at least in some regions. In order to be able to guide the at least one connection field around the projection when the base plate is approached towards the support structure, the at least one connection field can be held on the base plate such that it can move relative to the base plate. As the base plate is approached towards the support structure, the at least one connection field can be deflected to allow the at least one connection field to be guided around the protrusion. As soon as the at least one connection field has been moved completely past the projection in a direction of approach of the base plate towards the support structure, the at least one connection field can be moved into the recess of the support structure delimited in some regions by the protrusion, in order to be fastened in the recess on the inner side of the support structure.

In a further embodiment of the invention, it has been shown to be advantageous if the inner side of the support structure provides an undercut in a fastening direction of the at least one connection field on the inner side, the at least one connection field being arranged at least in some regions in the undercut. In this case, the fastening direction runs obliquely, in particular perpendicularly, to the direction in which the base plate is approached towards the support structure. By means of the undercut, it can be ensured that the connection field fastened to the support structure is held on the support structure by limiting a movement of the at least one connection field relative to the support structure in the fastening direction in a first direction by the undercut and in a second direction, opposite the first direction, in the fastening direction by the support structure. By means of the undercut, in addition to a mechanical connection of the at least one connection field to the support structure, a holding of the at least one connection field on the support structure in the fastening direction can thus be ensured.

In a further embodiment of the invention, it has been shown to be advantageous if two connection fields are connected to the support structure and can be used to connect the high-voltage accumulator electrically and/or fluidically to the motor vehicle, wherein a first connection field is mechanically connected to a front region of the support structure delimiting the accumulator interior forwards in the vehicle longitudinal direction, and the second connection field is mechanically connected to a rear region of the support structure delimiting the accumulator interior rearwards in the vehicle longitudinal direction. This allows the high-voltage accumulator to be connected in a particularly advantageous manner to a front region of the vehicle via the front region of the support structure and to a rear region of the motor vehicle via the rear region of the support structure. In the front region and in the rear region of the motor vehicle, the high-voltage accumulator can be electrically connected via the respective connection fields to respective electric motors driving wheels of the motor vehicle, whereby electrical energy stored in the high-voltage accumulator can be provided for the electric motors via the connection fields. This means that lines in the motor vehicle or in the high-voltage accumulator can be kept particularly short by arranging the connection fields in the front region and/or in the rear region of the support structure so that they are particularly close to the respective consumers of electrical energy.

A further aspect of the invention relates to a high-voltage accumulator arrangement of a high-voltage accumulator on a motor vehicle, having a plurality of battery modules which are arranged on and fastened to a base plate, and having a bottom plate of a support structure of the motor vehicle. The base plate is fastened to the bottom plate of the support structure, whereby the base plate and the bottom plate provide an accumulator housing, which delimits an accumulator interior and in which the battery modules can be accommodated. The bottom plate and the base plate thus jointly enclose the battery modules of the high-voltage accumulator, wherein a separate accumulator housing for the high-voltage accumulator can be spared. This makes the high-voltage accumulator particularly lightweight. In order to be able to connect the high-voltage accumulator particularly simply and reliably electrically and/or fluidically to the motor vehicle, it is provided in accordance with the invention that at least one connection field of the high-voltage accumulator arrangement, via which the high-voltage accumulator can be electrically and/or fluidically connected to the motor vehicle, is mechanically connected to the support structure. All electrical and/or fluidic connections of the high-voltage accumulator to the motor vehicle can be provided via the at least one connection field. All interfaces of the high-voltage accumulator to the motor vehicle can be arranged particularly close to one another via the at least one connection field, whereby the high-voltage accumulator can be contacted electrically and/or fluidically with the motor vehicle particularly easily and thus particularly quickly.

In this context, it has proven particularly advantageous if the at least one connection field is screwed to the support structure. This means that at least one screw connection is provided, via which the at least one connection field is held to the support structure. The screw connection allows a particularly simple, low-cost and rapidly produced secure connection of the at least one connection field to the support structure.

In a development of the invention, it has been shown to be particularly advantageous if the at least one connection field is held on the base plate such that it can be moved relative to the base plate. In this case, the at least one connection field is in particular preassembled on the base plate and can be moved together with the base plate towards the bottom plate in the direction of approach. The movable arrangement of the at least one connection field on the base plate allows the at least one connection field to avoid at least one region of the support structure when the base plate is approached towards the bottom plate, in particular to be guided around a projection of the support structure. The movable arrangement of the at least one connection field on the base plate thus allows, on the one hand, a particularly simple assembly of the high-voltage accumulator due to the preassembly and, on the other hand, a particularly simple contacting of the high-voltage accumulator with the motor vehicle even if the geometry of the support structure has at least one projection.

Preferably, the connection field is assembled or at least preassembled on the support structure in one step, in particular via a fluid-tight connection. In a subsequent step, the base plate is then assembled or at least preassembled on the support structure, in particular via a fluid-tight connection. An electrical and/or fluidic connection between the connection field and corresponding components of the high-voltage accumulator is advantageously established only after the step of assembling or preassembling the base plate on the support structure, if necessary by means of a maintenance and repair access point of the high-voltage accumulator. The maintenance and repair access point can be closed, for example, with a maintenance flap, in particular in a fluid-tight manner.

Advantages and advantageous developments of the method according to the invention are to be regarded as advantages and advantageous developments of the high-voltage accumulator arrangement according to the invention, and vice versa.

Further features of the invention will become clear from the claims, the figures and the figure description. The features and combinations of features mentioned above in the description, as well as the features and combinations of features mentioned below in the figure description and/or shown alone in the figures, can be used not only in the combination indicated in each case, but also in other combinations or on their own.

The invention will now be explained in more detail with reference to a preferred exemplary embodiment and with reference to the drawings.

BRIEF DESCRIPTION OF THE DRAWINGS

Like reference signs are assigned to functionally like elements in the figures.

DETAILED DESCRIPTION OF THE DRAWINGS

Figure 1:
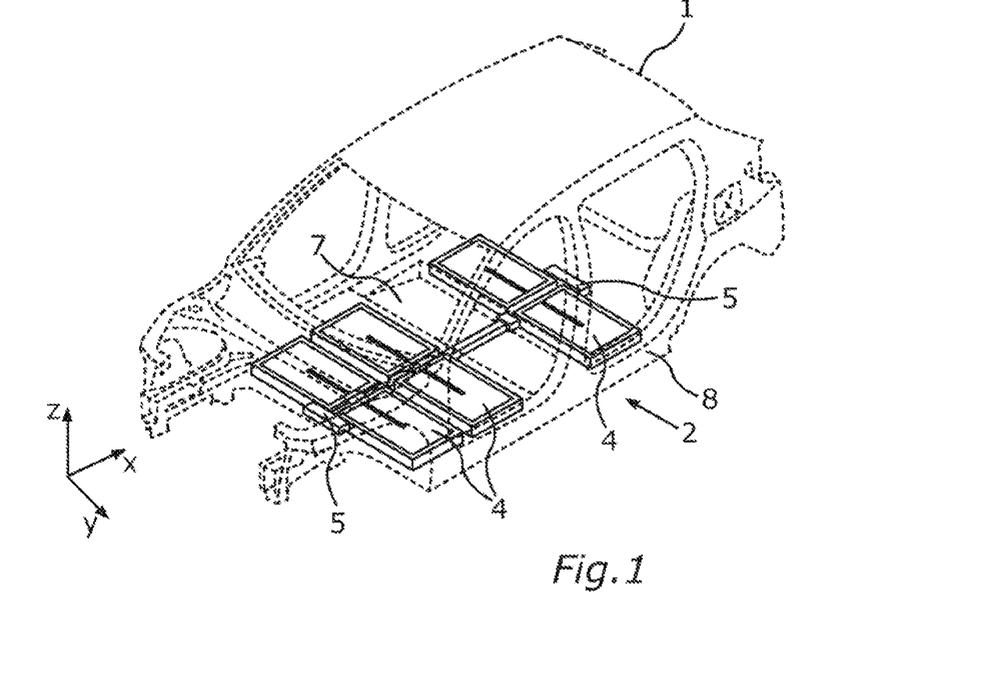
FIG. 1 is a schematic perspective view of a motor vehicle with a high-voltage accumulator by means of which electrical energy can be provided for an electric drive device of the motor vehicle, wherein the high-voltage accumulator is arranged in a floor region of the motor vehicle.

FIG. 1 shows a motor vehicle 1 with a modular floor assembly, wherein the modular floor assembly comprises a body-integrated high-voltage accumulator 2. The high-voltage accumulator 2 comprises a base plate 3 on which a plurality of battery modules 4 are arranged. Each of the battery modules 4 comprises at least one battery cell, in particular a plurality of battery cells, in which electrical energy can be stored. As can be seen in FIG. 1, the battery modules 4 of the high-voltage accumulator 2 are arranged in a floor region of the motor vehicle 1 and are contacted with the motor vehicle 1 via respective connection fields 5.

Figure 2:
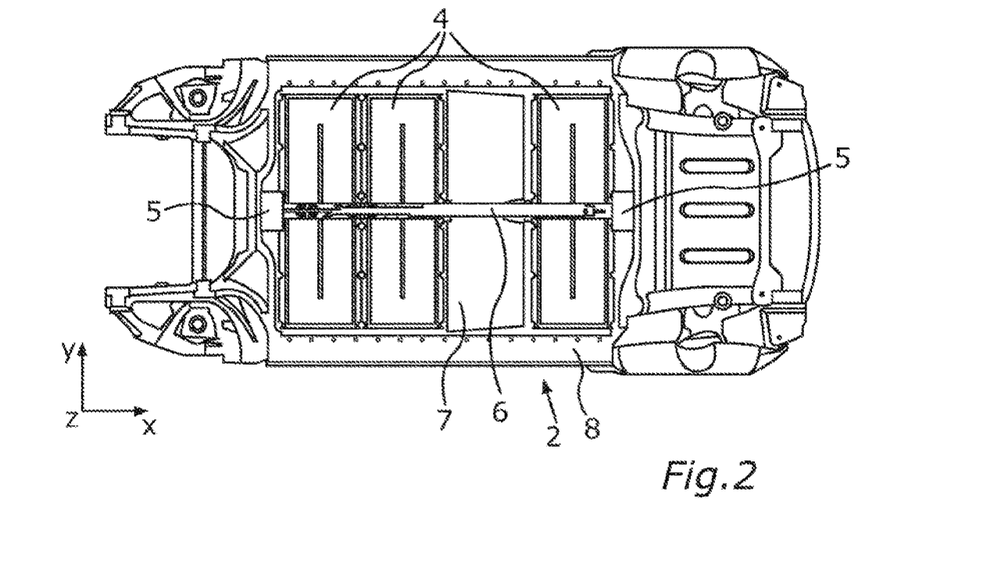
FIG. 2 is a schematic plan view of the floor region of the motor vehicle with the high-voltage accumulator, which has a plurality of battery modules, and with two connection fields via which the high-voltage accumulator can be electrically and/or fluidically connected to the motor vehicle.

In FIG. 2, it can be seen particularly well that the battery modules 4 of the high-voltage accumulator 2 are connected to the connection fields 5 via respective electrical connection lines 6. The connection fields 5 each provide at least one electrical and/or fluidic interface, via which the high-voltage accumulator 2 can be electrically and/or fluidically connected to the motor vehicle 1. For this purpose, the at least one electrical interface of the various connection fields 5 can be electrically connected to the electrical connection lines 6 and to electrical lines of the motor vehicle 1. The battery modules 4 are held on the motor vehicle 1 via a bottom plate 7 of a support structure 8 of the motor vehicle 1. The support structure 8 in this case is a body of the motor vehicle 1. It can be seen particularly clearly in FIG. 3 that the high-voltage accumulator 2 is a body-integrated high-voltage accumulator 2 in which a separate high-voltage accumulator housing is not provided. An accumulator housing of the high-voltage accumulator 2, which delimits an accumulator interior 9 in which the battery modules 4 are accommodated, is provided by the base plate 3 and the bottom plate 7 of the support structure 8 of the motor vehicle 1.

Figure 3:
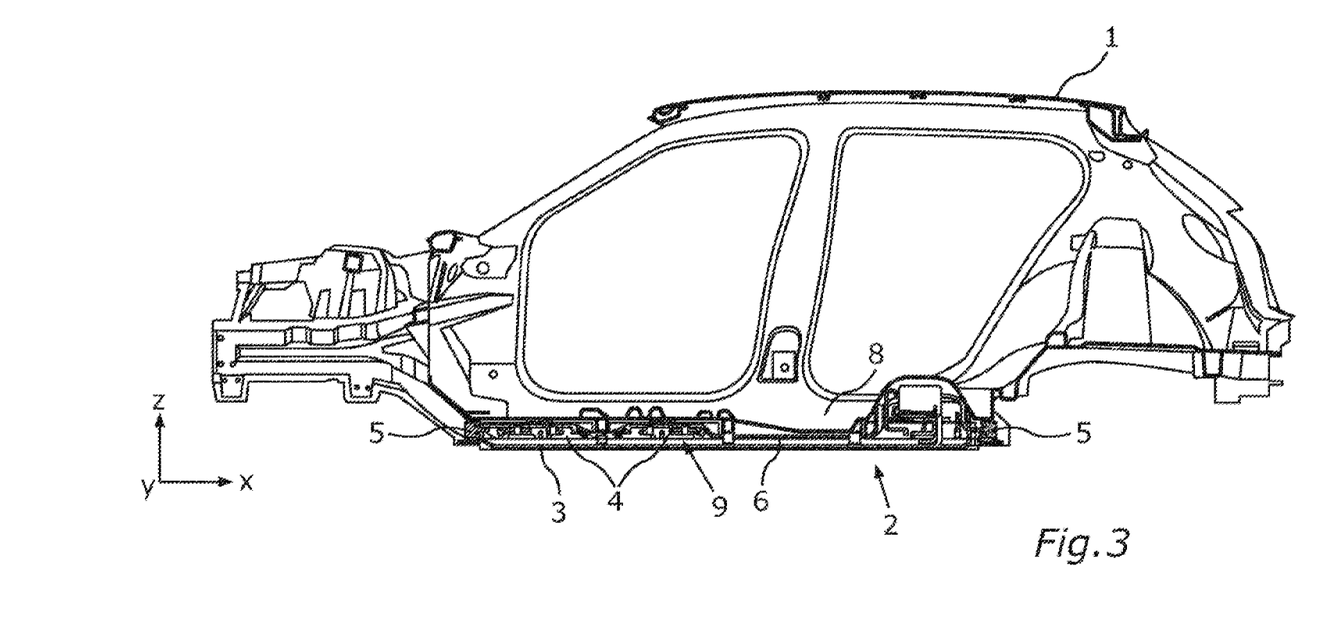
FIG. 3 is a schematic side view of the motor vehicle with the high-voltage accumulator, wherein it can be recognized that a front connection field connects a front end of the high-voltage accumulator in a vehicle longitudinal direction to a front region of the motor vehicle and a rear connection field connects a rear end of the high-voltage accumulator in the vehicle longitudinal direction to a rear region of the motor vehicle.

Thus, in order to arrange the high-voltage accumulator 2 on the motor vehicle 1, the battery modules 4 are preassembled on the base plate 3, and the base plate 3 together with the battery modules 4 is brought towards the bottom plate 7 of the support structure 8. Subsequently, the base plate 3 is fastened to the bottom plate 7 of the support structure 8, whereby the base plate 3 and the bottom plate 7 delimit the accumulator interior 9. In order to be able to connect the high-voltage accumulator 2 electrically and/or fluidically to the motor vehicle 1, the at least one connection field 5 is provided, via which the high-voltage accumulator 2 can be connected electrically and/or fluidically to the motor vehicle 1, in that the connection fields 5 are connected mechanically to the support structure 8 of the motor vehicle 1 and, furthermore, the connection fields 5 are connected fluidically and/or electrically both to the high-voltage accumulator 2 and to the motor vehicle 1. In the present case, exactly two connection fields 5 are provided, namely a front connection field 5 and a rear connection field 5. The front connection field 5 is arranged at an edge of the high-voltage accumulator 2 arranged to the front in the vehicle longitudinal direction x of the motor vehicle 1. The rear connection field 5 is arranged at a rear edge of the high-voltage accumulator 2 in the longitudinal direction x of the motor vehicle 1.

FIGS. 4a to 7b each show different arrangements of the connection fields 5 on the support structure 8 of the motor vehicle 1. Here, FIGS. 4a, 5a, 6a and 7a show respective variants of the connection of the front connection field 5. FIGS. 4b, 5b, 6b and 7b show respective variants of the connection of the rear connection field 5. The respective connections of the front connection fields 5 shown in FIGS. 4a to 7a can be combined as desired with the respective arrangements of the rear connection fields 5 shown in FIGS. 4b to 7b. Presently, each of the connection fields 5 is connected to the support structure 8 via a mechanical connection, presently via a plurality of screw connections 10, and/or via a form fit and/or via an integral bond. The front connection field 5 shown in FIG. 4a has a fluid interface via which the front connection field 5 can be connected to a fluid line 11 of the high-voltage accumulator 2. The high-voltage accumulator 2 can be fluidically coupled to the motor vehicle 1 via the fluid line 11 and the fluid interface of the front connection field 5. In the present case, the high-voltage accumulator 2 can be fluidically connected to a cooling circuit of the motor vehicle 1 via the fluid interface of the connection field 5. Alternatively or in addition to the arrangement of the fluid interface on the front connection field 5, a fluid interface can be arranged on the rear connection field 5.

Figure 4A:
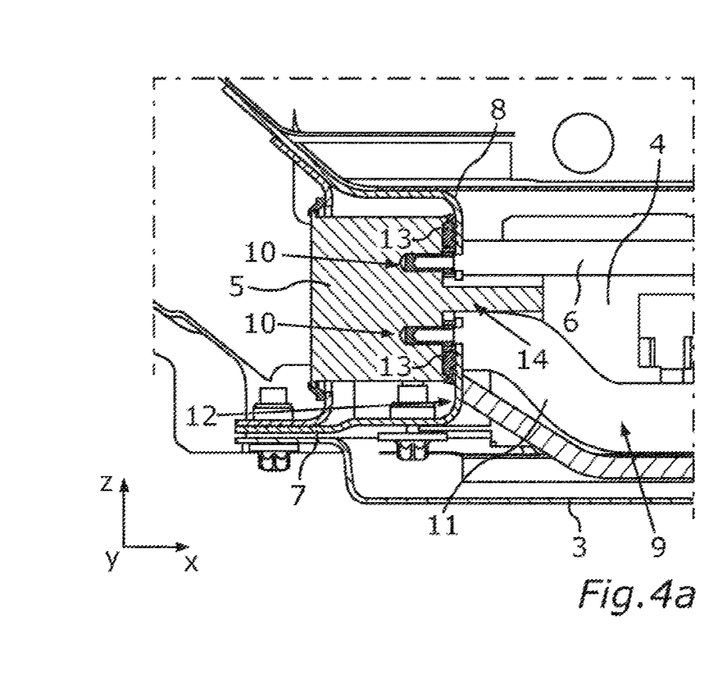
FIGS. 4a-b are schematic sectional views of respective connections of the front connection field and the rear connection field on a support structure of the vehicle in a first variant.
Figure 4B:
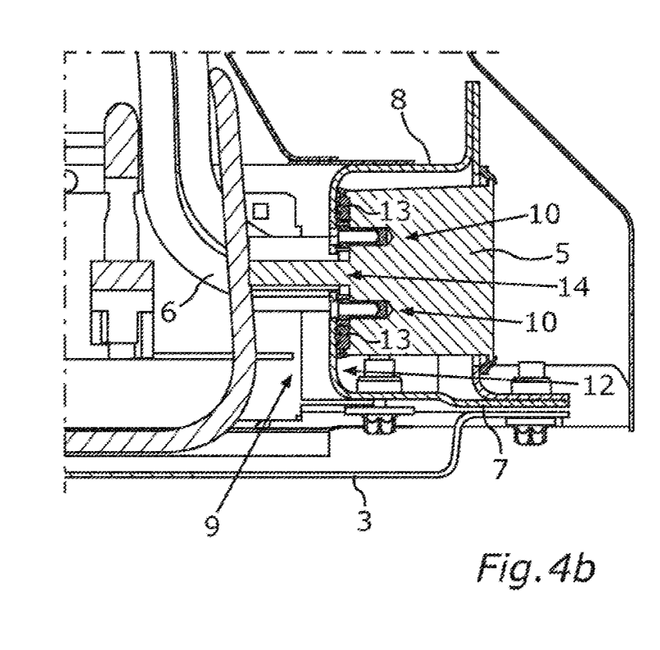

In the respective variants of the arrangement of the connection fields 5 shown in FIGS. 4a and 4b, the connection fields 5 are applied to an outer side 12 of the support structure 8 facing away from the accumulator interior 9 and are screwed to this outer side 12. In order to be able to keep the accumulator interior 9 tight, the respective connection fields 5 are sealed with respect to the outer side 12 of the support structure 8 by means of a sealing element 13. In order to be able to contact the connection fields 5 electrically and/or fluidically with the high-voltage accumulator 2, the connection fields 5 in the variant shown in FIGS. 4a and 5b are inserted in some regions through a through-opening 14 of the support structure 8 into the accumulator interior 9 of the high-voltage accumulator 2. A region of the connection fields 5 arranged in the accumulator interior 9 comprises at least the electrical and/or fluidic interface via which the connection field 5 in question can be electrically and/or fluidically contacted with the high-voltage accumulator 2. For an electrical and/or fluidic connection, the connection fields 5 in this variant are thus placed against the outer side 12 of the support structure 8, pushed through the through-opening 14 of the support structure 8 in some regions, and electrically and/or fluidically contacted in the accumulator interior 9 of the high-voltage accumulator 2.

Figure 5A:
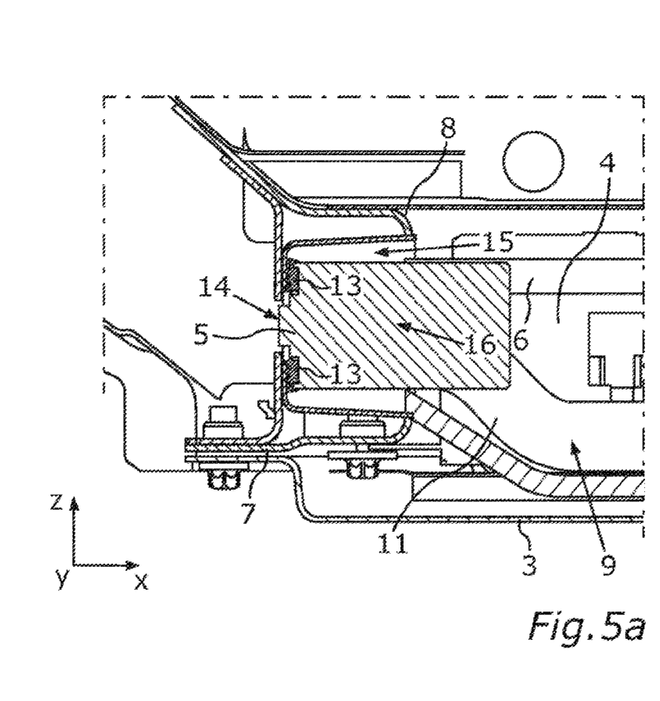
FIGS. 5a-b are schematic sectional views of various connections of the front connection field and the rear connection field on a support structure of the motor vehicle in a second variant.
Figure 5B:
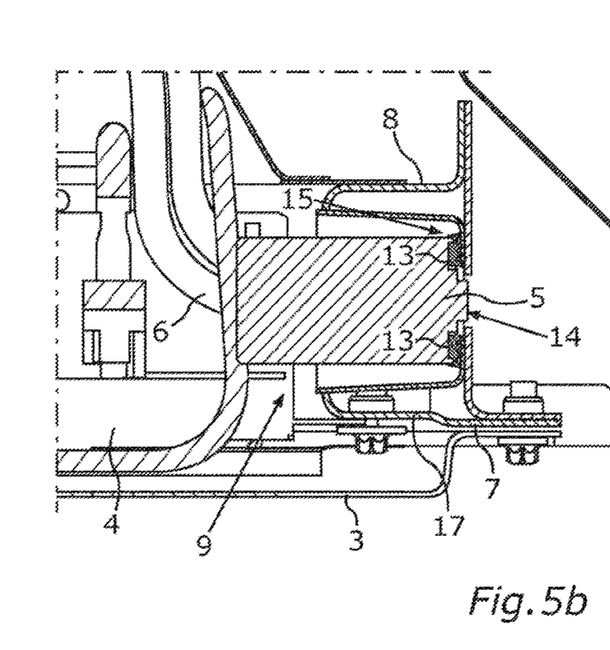

In the variants of the connection of the connection fields 5 to the support structure 8 shown in FIGS. 5a to 7b, the respective connection fields 5 are in contact with the support structure 8 of the motor vehicle 1 on an inner side 15 facing the accumulator interior 9 and are fastened to this inner side 15. In this case, the respective connection fields 5 can be mechanically connected to the support structure 8 via respective screw connections 10, as shown in FIGS. 6a to 7b, or can be mechanically connected to the inner side 15 of the support structure 8 via a form fit and/or an integral bond, as in the variants shown in FIGS. 5a and 5b. In this case, the connection fields 5 are sealed with respect to the inner side 15 of the support structure 8 via at least one sealing element 13, whereby the accumulator interior 9 is tightly sealed. The respective connection fields 5 can be electrically and/or fluidically contacted with the motor vehicle 1 via a through-opening 14 of the support structure 8. As shown in FIGS. 5a and 5b, the support structure 8 can provide a recess 16 within which the connection fields 5 can be fastened to the inner side 15 of the support structure 8. The recess 16 is delimited, at least in some regions, by a projection 17 of the support structure 8.

When arranging the base plate 3 on the bottom plate 7 of the support structure 8, in a pre-assembled state of the connection fields 5 via the electrical connection lines 6 and/or the fluid lines 11, the respective connection fields 5 are to be guided around the corresponding projection 17 in order to be subsequently arranged in the recess 16. In order to allow the respective connection fields 5 to be guided around the projections 17 when the base plate 3 is brought toward the bottom plate 7, the connection fields 5 in the variant shown in FIGS. 5a and 5b are held on the base plate 3, at least indirectly, so as to be movable relative to the base plate 3. This means that the at least one connection field 5 can be deflected obliquely with respect to a direction of approach in which the base plate 3 can be approached towards the bottom plate 7, in order to guide the connection field 5 in question around the projection 17 and then be able to move it into the recess 16 of the support structure 8, at least in some regions, whereby the connection field 5 in question can be fastened in the recess 16 on the inner side 15 of the support structure 8.

Figure 6A:
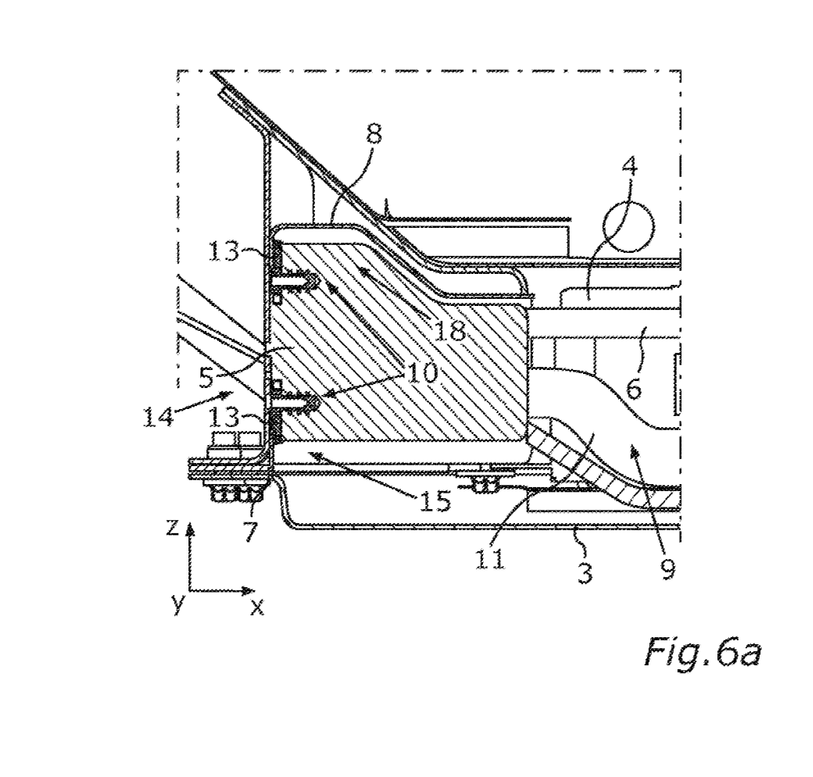
FIGS. 6a-b are schematic sectional views of respective connections of the front connection field and the rear connection field on a support structure of the motor vehicle in a third variant.

In the variant of the arrangement of the connection field 5 on the support structure 8 shown in FIG. 6a, the support structure 8 provides an undercut 18, in which the associated connection field 5 can be arranged at least in some regions. Via the undercut 18, after mechanical fixing of the particular connection field 5 to the inner side 15 of the support structure 8, via which the connection field 5 is fixed relative to the support structure 8 in the vehicle vertical direction z, the connection field 5 can be fixed in the vehicle longitudinal direction x relative to the support structure 8. By means of the undercut 18 of the support structure 8, the connection field 5 can thus be fixed relative to the support structure 8 in the vehicle longitudinal direction x in one direction and by means of a striking against the support structure 8 in the opposite direction. This allows the connection field 5 to be positioned particularly securely relative to the support structure 8 and to be fixed to the support structure 8.

Figure 6B:
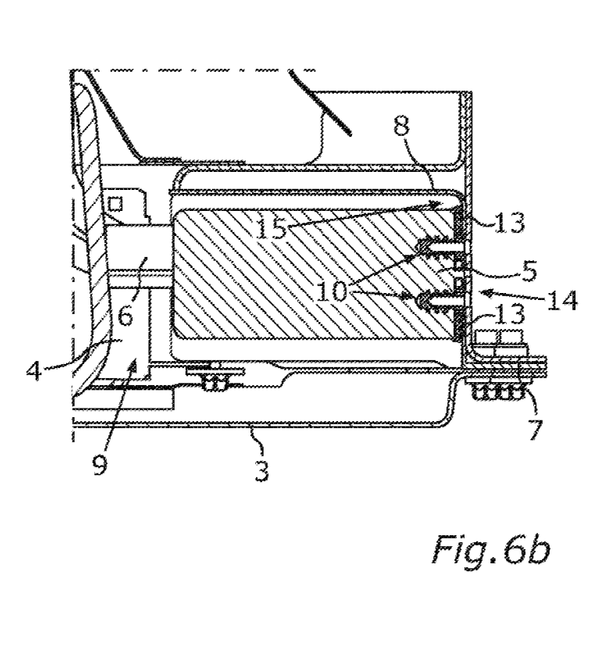

As can be seen in FIG. 6b, the support structure 8 can completely cover the associated connection field 5 in the vehicle vertical direction z, whereby the connection field 5 can be particularly reliably protected by the support structure 8 from a source of danger that would cause a force to act from above on the connection field 5 in the vehicle vertical direction z.

Figure 7A:
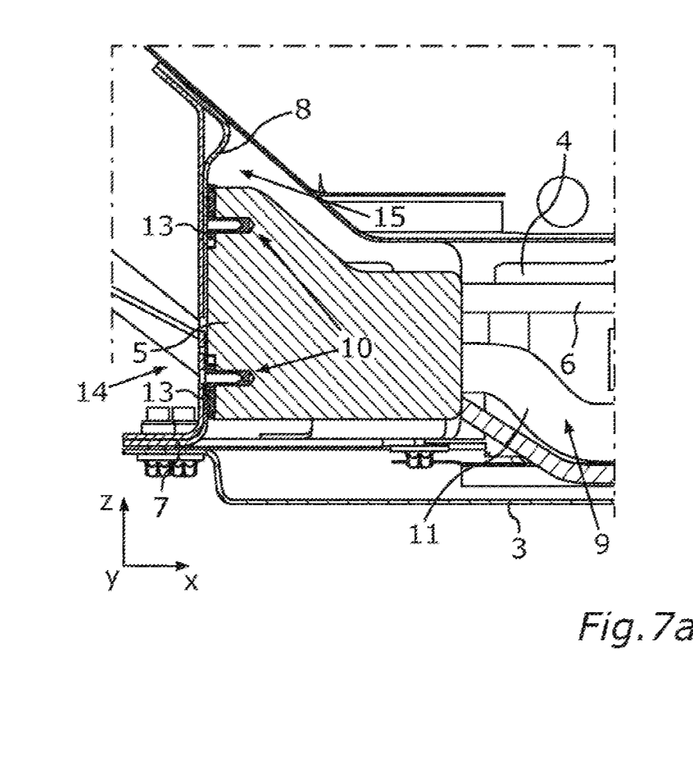
FIGS. 7a-b are schematic cross-sectional views of respective connections of the front connection field and the rear connection field on a support structure of the motor vehicle in a fourth variant.
Figure 7B:
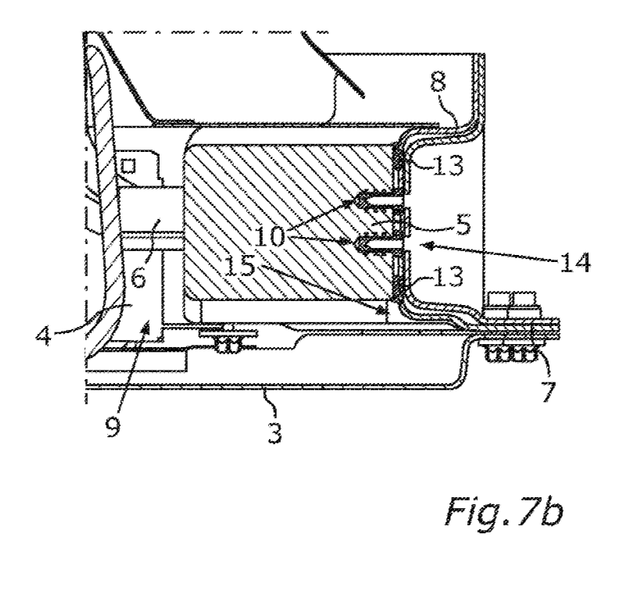

FIGS. 7a and 7b show particularly low-weight embodiments of the support structure 8, wherein in the variant of the arrangement of the connection field 5 on the support structure 8 shown in FIGS. 7a and 7b, the connection fields 5 are arranged on and mechanically fastened to the respective inner sides 15 of the support structure 8 facing the accumulator interior 9.

Overall, the invention shows how an assembly and contacting of connection fields 5 can be provided for a body-integrated high-voltage accumulator 2.

LIST OF REFERENCE SIGNS

1 motor vehicle
2 high-voltage accumulator
3 base plate
4 battery modules
5 connection field
6 electrical connection line
7 bottom plate
8 support structure
9 accumulator interior
10 screw connection
11 fluidic connection line
12 outer side
13 sealing element
14 opening
15 inner side
16 recess
17 projection
18 undercut
x vehicle longitudinal direction
z vehicle vertical direction

The invention claimed is:

1. A method for arranging a high-voltage accumulator having a plurality of battery modules on a support structure of a motor vehicle, comprising:
arranging the battery modules on, and fastened to, a base plate;
fastening the base plate to a bottom plate of the support structure of the motor vehicle, whereby the base plate and the bottom plate provide an accumulator housing which delimits an accumulator interior in which the plurality of battery modules are accommodated; and
mechanically connecting at least one connection field, via which the high-voltage accumulator is electrically and/or fluidically connectable to the motor vehicle, to the support structure, wherein
the at least one connection field with the base plate is brought toward the support structure and is placed against and fastened to the support structure on an inner side of the support structure facing the accumulator interior.

2. The method according to claim 1, wherein
the at least one connection field is sealed with respect to an inner side of the support structure.

3. The method according to claim 1, wherein
the at least one connection field is guided around a projection of the support structure when the base plate is brought toward the support structure, is guided at least in some regions into a recess of the support structure, the recess being delimited in some regions by the projection, and is fastened in said recess on an inner side of the support structure.

4. The method according to claim 1, wherein
an inner side of the support structure provides an undercut in a fastening direction of the at least one connection field on the inner side, the at least one connection field being arranged at least in some regions in the undercut.

5. A method for arranging a high-voltage accumulator having a plurality of battery modules on a support structure of a motor vehicle, comprising:
arranging the battery modules on, and fastened to, a base plate, each module comprising a plurality of battery cells;
fastening the base plate to a bottom plate of the support structure of the motor vehicle, whereby the base plate and the bottom plate provide an accumulator housing which delimits an accumulator interior in which the plurality of battery modules are accommodated so as to form a body-integrated high-voltage accumulator without a separate high-voltage accumulator housing; and
mechanically connecting at least one connection field, via which the high-voltage accumulator is electrically and/or fluidically connectable to the motor vehicle, to the support structure, wherein
two connection fields are connected to the support structure and are usable to connect the high-voltage accumulator electrically and/or fluidically to the motor vehicle,
a first of the two connection fields is mechanically connected to a front region of the support structure delimiting the accumulator interior forwardly in a vehicle longitudinal direction, and
a second connection of the two fields is mechanically connected to a rear region of the support structure delimiting the accumulator interior rearwardly in the vehicle longitudinal direction.

6. A high-voltage accumulator arrangement of a high-voltage accumulator on a motor vehicle, comprising:
a base plate;
a plurality of battery modules which are arranged on, and fastened to, the base plate, each module comprising a plurality of battery cells; and
a bottom plate of a support structure of the motor vehicle, to which bottom plate the base plate is fastened, whereby the base plate and the bottom plate provide an accumulator housing, delimiting an accumulator interior in which the plurality of battery modules are accommodated so as to form a body-integrated high-voltage accumulator without a separate high-voltage accumulator housing; and
at least one connection field, via which the high-voltage accumulator is electrically and/or fluidically connectable to the motor vehicle and which is mechanically connected to the support structure,
wherein the at least one connection field is held on the base plate so as to be movable relative to the base plate.

7. The high-voltage accumulator arrangement according to claim 6, wherein
the at least one connection field is screwed to the support structure.

* * * * *